United States Patent [19]

Mayo et al.

[11] Patent Number: 5,751,965
[45] Date of Patent: May 12, 1998

[54] NETWORK CONNECTION STATUS MONITOR AND DISPLAY

[75] Inventors: Gregory E. Mayo, Salem; Roger G. Desroches, Dover; David N. Nedde, Durham, all of N.H.

[73] Assignee: Cabletron System, Inc., Rochester, N.H.

[21] Appl. No.: 619,012

[22] Filed: Mar. 21, 1996

[51] Int. Cl.$^6$ .................................................. G06F 3/00
[52] U.S. Cl. .................. 395/200.54; 345/329; 345/359; 345/969
[58] Field of Search ................... 395/326–358, 395/969, 200.01, 200.11, 200.5, 200.51, 200.52, 200.53, 200.54; 345/326–358, 969

[56] References Cited

U.S. PATENT DOCUMENTS

| | | | |
|---|---|---|---|
| 4,833,592 | 5/1989 | Yamanaka | 395/978 X |
| 5,226,120 | 7/1993 | Brown et al. | 395/200.11 |
| 5,261,044 | 11/1993 | Dev et al. | 395/329 |
| 5,353,399 | 10/1994 | Kuwamoto et al. | 345/359 |
| 5,394,522 | 2/1995 | Sanchez-Frank et al. | 395/978 X |
| 5,436,909 | 7/1995 | Dev et al. | 395/329 |
| 5,452,415 | 9/1995 | Hotka | 395/200.11 |
| 5,481,674 | 1/1996 | Mahavadi | 395/200.11 |
| 5,483,631 | 1/1996 | Nagai et al. | 395/200.02 |
| 5,559,955 | 9/1996 | Dev et al. | 395/200.01 X |
| 5,606,664 | 2/1997 | Brown et al. | 395/200.11 X |
| 5,627,819 | 5/1997 | Dev et al. | 395/200.01 X |

FOREIGN PATENT DOCUMENTS 0 609 990 A2  8/1994  European Pat. Off. ........ G06F 11/30
WO 93/10495  5/1993  WIPO ........................... G06F 11/32

OTHER PUBLICATIONS

LAN Times, vol. 10, Issue 9, May 10, 1993.
Spectrum® Multivendor Management, pp. 14–17 (1996), Cabletron Systems, Inc. (Rochester, New Hampshire).
Spectrum® SpectroPhone (brochure) (1996), Cabletron Systems, Inc. (Rochester, New Hampshire).
Spectrum® Command Line Interface (brochure) (1996), Cabletron Systems, Inc. (Rochester, New Hampshire).
Spectrum® Physical Management Gateway (brochure) (1996), Cabletron Systems, Inc. (Rochester, New Hampshire).
Spectrum® Data Gateway (brochure) (1996), Cabletron Systems, Inc. (Rochester, New Hampshire).
Spectrum® MaestroVision (brochure) (1996), Cabletron Systems, Inc. (Rochester, New Hampshire).

*Primary Examiner*—John E. Breene
*Attorney, Agent, or Firm*—Wolf, Greenfield & Sacks, P.C.

[57] ABSTRACT

A system provides representations of connections or other relationships among entities that make up a communications network. The representations may each have a color or shading to represent different conditions of the relationship. The representations may be graphical and may also include textual information as well as graphical hot-spots selectable by a user to provide even more detailed information regarding the relationship. The condition of each relationship may be determined based upon a combination of the conditions of the interface elements which are coupled together to form the communications relationship.

28 Claims, 10 Drawing Sheets

|  |  | PORT 1 | | | | |
|---|---|---|---|---|---|---|
|  |  | GOOD | BAD | UNKNOWN | DISABLED | UNREACH-ABLE |
| PORT 2 | GOOD | GREEN | RED | GREEN | BROWN | GRAY |
|  | BAD | RED | RED | RED | ORANGE | GRAY |
|  | UNKNOWN | GREEN | RED | GREEN | BROWN | GRAY |
|  | DISABLE | BROWN | ORANGE | BROWN | BROWN | BROWN |
|  | UNREACH-ABLE | GRAY | GRAY | GRAY | BROWN | GRAY |

*FIG. 5*

| OVERRIDE | COLOR | STATUS |
|---|---|---|
| LEVEL 7 | BLUE | INITIALIZED |
| LEVEL 6 | GRAY | UNKNOWN |
| LEVEL 5 | BROWN | DISABLED |
| LEVEL 4 | RED | BAD |
| LEVEL 3 | ORANGE | DISABLED/BAD |
| LEVEL 2 | YELLOW | OTHER |
| LEVEL 1 | GREEN | GOOD |

*FIG. 6*

NETWORK CONNECTION STATUS MONITOR AND DISPLAY

BACKGROUND OF THE INVENTION

1. Field of the Invention

This invention relates generally to communications networks, and more particularly to a method and apparatus for monitoring and displaying the status of connections or other relationships in a computer network.

2. Discussion of the Related Art

Computer networks are widely used to provide increased computing power, sharing, of resources and communication between users. Networks may include a number of computer devices within a room, building or site that are connected by a high-speed local data link, such as local area network (LAN), token ring, Ethernet, or the like. Local networks in different locations may be interconnected by for example packet switches, microwave links and satellite links to form it wide area network (WAN). A network may include several hundred or more connected devices, distributed across several geographical locations and belonging to several organizations.

In the operation and maintenance of computer networks a number of issues arise, including traffic overload on various parts of the network, optimum placement and interconnection of network resources, security, isolation of network faults, and the like. These issues become increasingly complex and difficult to understand and manage as the network becomes larger. For example, if a device is not sending messages, it may be difficult to determine whether the fault is in the device itself, a data communication link, or an intermediate device between the sending, and receiving devices.

Network management systems are intended to resolve such issues. Older management systems typically operated by collecting large volumes of information which then required evaluation by a network administrator, and thus placed a tremendous burden on and required a highly-skilled network administrator.

Newer management systems systematize the knowledge of the networking, expert such that common problems of a single domain (i.e., a portion of the network under common management) can be detected, isolated and repaired, either automatically or with the involvement of less-skilled personnel. Such a system typically includes a graphical representation of that portion of the network being monitored by the system. Alarms are generated to inform an external entity that an event has occurred which requires attention. Since a large network may have many such events occurring simultaneously, the management system may provide alarm filtering.

Network management systems and related applications which are commercially available include: (1) SPECTRUM®, Cabletron Systems, Inc., 35 Industrial Way, Rochester, N.H. 03867; (2) HP OpenView, Hewlett Packard Corp., 3000 Hanover Street, Palo Alto, Calif. 94304; (3) LattisNet, Bay Networks, 4401 Great American Pkwy., Santa Clara, Calif. 95054; (4) IBM Netview/6000, IBM Corp., Old Orchard Road, Armonk, N.Y. 10504; and (5) SunNet Manager, SunConnect, 2550 Garcia Ave, Mountain View, Calif. 94043.

An important aspect of any network management system is the way in which information is presented to a user, whether the user is a highly-skilled network administrator or a less-skilled technician. Network information is usually presented on a video display screen, and it is important that the display clearly identify the network entity (e.g., device or network) for which the information is presented. It is also important that the user be able to select additional information about a particular network entity and that such information be presented in a clear and well-organized manner. Finally, displays of network information should be flexible to accommodate differing network configurations and differing network management requirements.

FIG. 1 is a schematic illustration of a hub 10 which connects three networks 1, 2, 3. In this example, the first network 1 contains several devices 13A, 13B, 13C and an interface device 12. Typical examples of the devices 13A–C include personal computers, workstations, mainframe computers, and data storage/retrieval devices. Any of the devices 13A–C may be a source that transmits data across one or more of the networks, or a destination that receives data transmitted by a source. Many devices serve both as a source and a destination. The interface device 12 may be a bridge having, a connection 11 to port A of hub 10. The second network 2 also contains one interface device 14 having a connection 18 to port C of hub 10, and another interface device 15 having a connection 17 to port B of hub 10. The second network 2 also contains devices 16A, 16B, which may be similar to devices 13A–C. The third network 3, connected to port D of hub 10 via connection 19, may be a network similar to networks 1 and 2, or may represent a gateway to another network, or group of networks such as the Internet. The connections 11, 17, 18, 19 each may be a single wire or any type of data path between two nodes or among several nodes.

FIG. 2 is a display for conveying information regarding, the networks of FIG. 1 to a user, and is typical of displays provided by existing, network management systems. A device icon 20 represents the hub 10, a network icon 22 represents the first network 1, a network icon 24 represents the second network 2, and a network icon 26 represents the third network 3. A simple line 27A represents that a connection exists between network 1 and hub 10; similarly line 27B represents that a connection exists between network 2 and hub 10; and line 27C represents that a connection exists between network 3 and hub 10. As described in more detail below, each of device icon 20 and network icons 22, 24, 26 may contain information regarding the status of the entity (or entities) associated with the icon. Additionally, each icon may be selected by a user to display even more information. However, the lines 27A, 27B, 27C do not represent any information other than the fact that some connection exists between the entities represented by the icons.

While existing network management systems provide information regarding, devices in a network, no information is provided with regard to connections between the devices, nor with regard to other relationships between the functional entities of the network.

SUMMARY OF THE INVENTION

One aspect of the present invention is to provide graphical representations of connections or other relationships among entities that make up a communications network. The graphical representations each have a color or shading to represent different conditions of the relationship. The graphical representations may also contain textual information regarding the relationship as well as "hot-spots" selectable by a user to provide more detailed information regarding a selected relationship. The condition of each relationship may be determined based upon a combination of conditions of the individual interface elements which are coupled together to form the relationship.

One embodiment is a method and apparatus for displaying information about a communications network to a user, comprising the steps of determining a condition of a first interface element of the network, determining a condition of a second interface element of the network, the first and second interface elements having a relationship within the network, combining the conditions of the first and second interface elements to create a relationship condition, and displaying a representation of the relationship condition to the user.

Another embodiment is a method and apparatus for displaying information about a communications network to a user, comprising the step of maintaining a logical representation of the network that includes a first model representative of a first interface element and a second model representative of a second interface element, the first and second interface elements having a relationship within the network, and the logical representation including information regarding a condition of the relationship. This embodiment also comprises the step of displaying a representation of the relationship condition in a plurality of different displays which each provide a different view of the network.

Any of the above embodiments may be combined in various ways to provide additional embodiments and provide the following, variations and detail. For example, a condition of each of the first and second interface elements may include a condition of a first port of a first device and a second port of a second device, the first and second ports having a connection represented by the representation. The condition may be classified as one of a predetermined plurality of interface element conditions including a "good" condition indicative that an interface element is operational, a "bad" condition indicative that an interface element has a faulty status, an "unknown" condition indicative that an interface element has an unknown status, a "disabled" condition indicative that an interface element has been disabled, and an "unreachable" condition indicative that the interface element is not communicating.

The condition of an interface may be determined by logically combining the condition of the first interface element with the condition of the second interface element to determine the condition of the relationship. The representation of the relationship may be a graphical image having, a color that is selected based upon the condition of the relationship, and a plurality of different displays may be used to represent different information about the network.

A logical representation of the network may include a first model representative of a first interface element and a second model representative of a second interface element, and a connection relationship may be associated with the first model and the second model.

The network may be monitored, and a process may be invoked when the relationship is established or when the condition of one of the interface elements changes. Also, combining the conditions may include creating a condition of a first data path between a first interface element and a second interface element, determining a condition of a second data path between the elements that is parallel with the first data path, and logically combining the conditions of the first and second data paths to create a condition representative of the combined parallel data path. The display may then include a condition representative of the parallel data path.

BRIEF DESCRIPTION OF THE DRAWINGS

Other features and advantages of the present invention shall appear from the following description of an exemplary embodiment, said description being made with reference to the appended drawings, of which:

FIG. 5 illustrates a condition table for selecting the color of an interface display;

FIG. 6 illustrates a table for selecting a color for an interface icon which represents an interface having more than one connection;

DETAILED DESCRIPTION

In accordance with one specific embodiment of the present invention, a network management system provides a graphical representation of a connection or other relationship between devices within a communications network. A connection relationship is typically a hard-wired connection between ports of two devices, but may also represent a virtual connection between entry points of any entities, such as other networks. The devices include not only hardware devices such as personal computers (PCs), workstations, hubs, routers, bridges, and repeaters, but also software applications. The graphical representation contains information about the relationship that has previously not been available.

Figure 3:
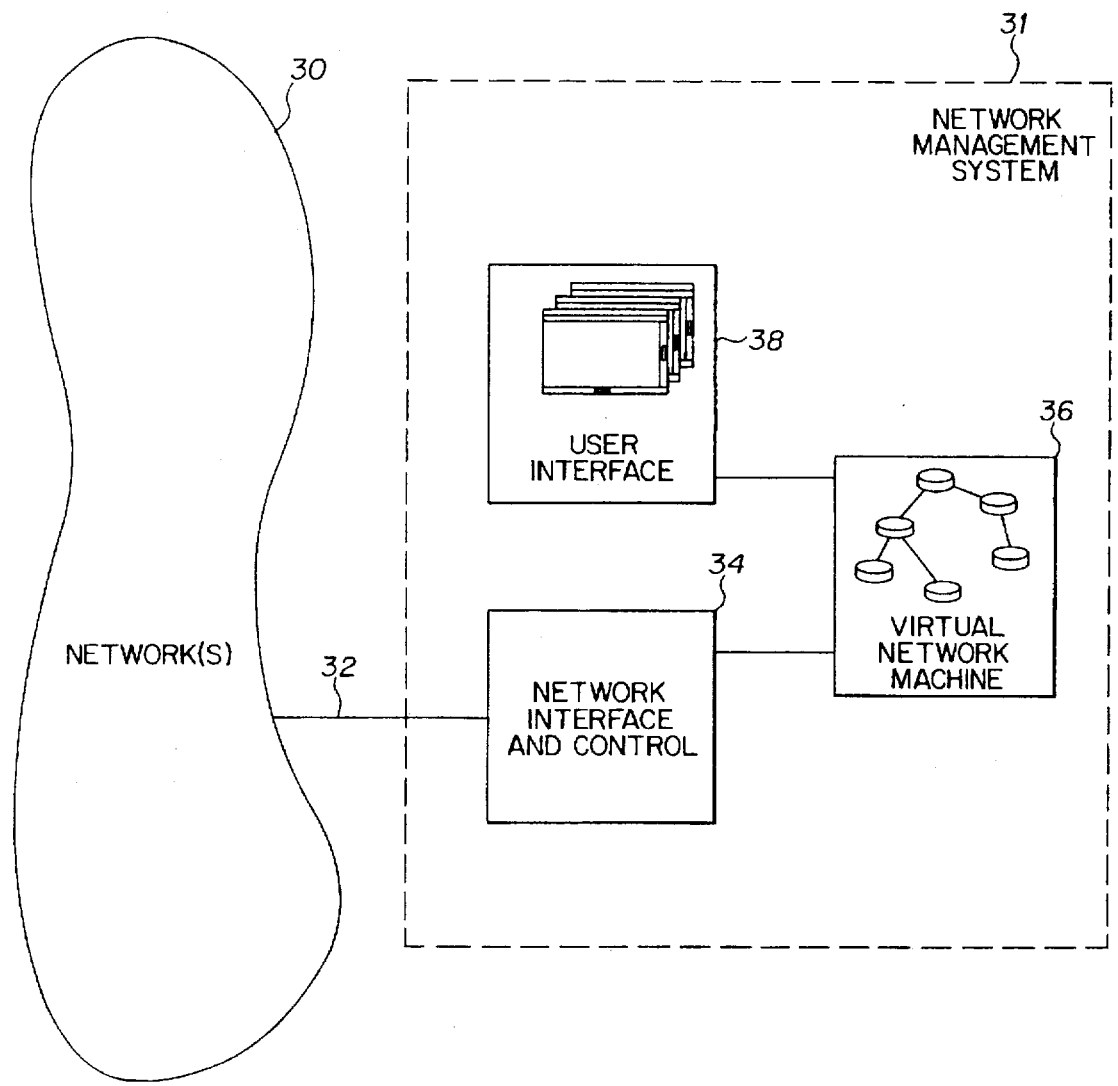
FIG. 3 is a block diagram illustrating generally the arrangement of a network management system including an embodiment of the present invention.

FIG. 3 is a block diagram illustrating generally the arrangement of the network management system 31 which monitors a live network 30 via communication interface 32. In this example, the network management system 31 is SPECTRUM®, which includes a database of models relating to corresponding network entities and relationships between those entities. The management system 31 includes a network interface and control module 34, a virtual network machine 36, and a user interface 38.

The SPECTRUM network management system continually monitors the network 30 and maintains a database of information about managed devices within the network 30. An understanding of the present invention is furthered by an understanding of a model-based SPECTRUM system, which is described in U.S. Pat. No. 5,261,044, issued Nov. 9, 1993 to R. Dev et al., and which is hereby incorporated by reference in its entirety. The SPECTRUM system is commercially available and is also described in various user manuals and literature available from Cabletron Systems, Inc., Rochester, N.H.

In summary, SPECTRUM is a system for maintaining and processing information pertaining to the condition of a computer network and providing the same to a user, the network including a plurality of network resources such as computer devices and software applications being executed on such devices. The system includes a virtual network machine 36, comprising a programmed digital computer, wherein a program is implemented using an object-oriented programming language such as C++, Eiffel, SmallTalk, or Ada. The virtual network machine 36 includes interrelated intelligent models of network entities and relations between network entities, including a capability for acquiring network data pertaining to the condition of a network entity from the corresponding network entity, and for those entities not capable of being, contacted, inferring their status from the status of other elements. The virtual network machine 36 maintains object which include network data relating to the corresponding network entity and one or more inference handlers for processing the network data, the inference handlers being responsive to changes occurring in the same and/or a different object. The network data can then be transferred to a user interface 38 coupled to the virtual network machine 36, for supplying the network data to a user.

Thus, the models may be implemented as software "objects" containing both "data" (attributes) relating to the corresponding network entity and one or more "inference handlers" (functions) for processing the data. See Grady Booch, "Object-Oriented Analysis And Design, With Applications," 2nd Edition, Benjamin/Cummings Publishing Co., Redwood City, Calif., Chapter 2 (1994). The inference handlers may be initiated by predetermined virtual network events, such as a change in specified network data in the same model, a change in specified network data in a different model, and predefined events or changes in models or model relations. Information pertaining, to the condition of the network resource can be obtained from the network entity by polling the resource, can be automatically received from the network resource without polling, or can be inferred from data contained in other models. An alarm condition may be generated when the network data meets a predetermined criteria. Events, alarms and statistical information from the virtual network may be stored in a database to be selectively displayed for the user.

The data in the SPECTRUM database may be used for generating topological displays of the network, showing hierarchial relationships between network devices, isolating a network fault, reviewing statistical information, as well as other functions.

The SPECTRUM network management system allows for collective management of autonomous local area networks (LANs), with equipment from different vendors. It complies with the current Simple Network Management Protocol (SNMP) standards, and can also accommodate other standard and proprietary protocols. The virtual network machine 36 preprocesses the raw information coming from the network devices through the network interface and control module 34 in order to construct a model of the network's current status and performance characteristics. Network elements that cannot be directly communicated with (e.g., cables and buildings) can infer their status from the status of the devices connected to or contained within them. The virtual network machine 36 provides a consistent interface for management applications to access any of the information in the model and thereby provides these applications with a unified view of the network 30.

The SPECTROGRAPH® user interface 38 provides a highly graphical multi-perspective view into the network model. The user interface enables the user to navigate through a landscape in which networks, local area networks and even rooms show up as icons, and which icons indicate the health and performance characteristics of those elements. Many of these icons can be further queried for additional information. The main function of the user interface 38 is to visually present to the user the model within the virtual network machine 36. It allows the user to navigate freely within the network model, only limited by the access rights assigned by the network administrator. The information can be accessed at varying degrees of detail, from a macro overview, to the devices and cables which connect them. In addition to its navigation functions, the SPECTROGRAPH user interface provides an alarm management facility, an event log window, a reporting facility, a find facility, and other features.

The block diagram of FIG. 3 illustrates generally the method and apparatus of one embodiment of the present invention. In this embodiment, the network interface and control module 34 determines the status of connections within the network, such as connections 11, 17, 18, and 19 depicted in FIG. 1. Moreover, the virtual network machine 36 contains explicit link information that represents the connection status between network entities, so that the user interface 38 may include a display which conveys link information directly to a user. As used herein, the term "connection" refers to the data path between or among network entities, while the term "link" refers to a data representation of such a connection. For example, a link may be an object within an object-oriented implementation within the virtual network machine 36.

Figure 4:
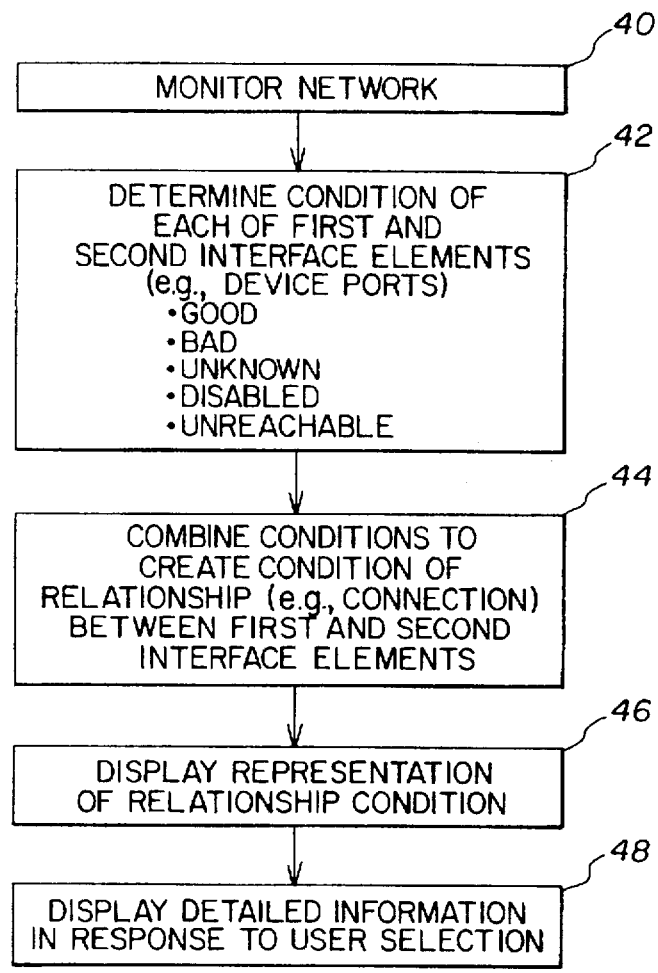
FIG. 4 is a flow diagram depicting a process performed by the elements of FIG. 3.

FIG. 4 is a flow diagram depicting a process in accordance with the present embodiment. In step 40, the network 30) is monitored. The network management system 31 may be directly connected to the network 30, or may receive information regarding network status indirectly. In step 42, the condition of each of a first and second interface element is determined. An example of all interface element is a port on a hub, such as port A on hub 10 of FIG. 1. However, any network entity which provides or assists in providing data flow between or among two or more network entities may be considered an interface element. Such an interface element may also be referred to as ail entry point, indicating that the interface is one in which data may enter a particular network. The classification of an interface element may change over time depending on the partitioning of a network from the perspective of the network management system. For example, the networks shown in FIG. 1 may be repartitioned, without reallocating any hardware or software, so that network 2, network 3, and hub 10 are all considered to be part of a single network, with connection 11 providing the interface between the single network and the first network 1.

As depicted ill step 42, the condition of each of the first and second interface elements may be selected from a predetermined plurality of conditions. Five such conditions are depicted in FIG. 4: good, bad, unknown, disabled, and unreachable. These conditions are described in more detail below.

In step 44, the conditions of the first and second interface elements are combined to create a condition that represents the relationship between the first and second interface elements. For example, the first and second interface elements may be a first port on a first hub and a second hub on a second hub, and the relationship may be a single wire that physically connects the two ports.

The step 40 of monitoring may include querying each of the first and second ports by sending a status request message to each of the first and second hubs. If data has recently been passed between the two ports, then both hubs would probably return a "good" condition of the respective ports to the network management system 31. In response, the network management system 31 would likely determine that the relationship (i.e. the single wire and the associated operation of the first and second ports) is good. However, it is also possible that both hubs would return a "bad" condition, for example if both hubs had previously attempted and failed to send data to the other hub via the respective ports. In such an instance, the network management system 31 would likely determine that the relationship is bad. Note that the relationship may be bad as a result of a single wire being broken, one of the ports containing faulty hardware or software, one of the ports being, purposely or accidentally disabled, or any other situation which would cause a decrease in data flow between the two hubs. Accordingly, the network management system 31 may represent the condition of data flow between network devices or between networks, which may or may not depend upon the actual status of the physical devices which may facilitate the data flow.

In step 46, a representation of the relationship condition is displayed, for example to a network administrator. The network administrator may desire additional information, such as diagnostics or the particulars of a faulty relationship. Accordingly, a user may select more detailed information, which the user interface 38 may provide as shown in step 48.

One approach to displaying a relationship condition is to display a connection as an icon such as a thick line having a color which the user may easily associate with a particular condition. For example, the color green is typically representative of a healthy condition, while the color red is typically representative of a bad condition. Accordingly, if a user interface 38 displays an icon with a particular color, a user may immediately understand the condition of a network without performing further inquiries. Such an intelligent color display is highly advantageous to a user, especially when the user is viewing a network represented by a large number of network entity icons. Of course, different shading styles or gray scales may also be advantageously used instead of or in combination with various colors.

FIG. 5 illustrates a condition table 50 indicating one approach to color selection of an interface display. In this example, the condition of each of port 1 and port 2 is determined, and the intersection of the row and column for those conditions of ports 1 and 2 in the table 50 determines the color of the interface icon which represents the connection between port 1 and port 2. For example, as discussed above, if port 1 and port 2 both are "good," then the intersection is "green" and the interface icon would be colored green, indicating a healthy operating interface.

In one embodiment, a red color is indicative that the interface is not operable, which is generally the case when either one of the ports is "bad." However, the color brown may be used to represent an interface that is not operable due to at least one of the ports being disabled. The color orange in FIG. 5 is used to indicate that although one port is disabled, the relationship would not be operable even if the disabled port were enabled, because the other port is bad. If one port is unreachable by the other port, for example not providing an acknowledgment in response to a message, the color gray is typically used unless the other port is disabled. Various colors may be used when the condition of one of the ports is unknown.

Figure 1:
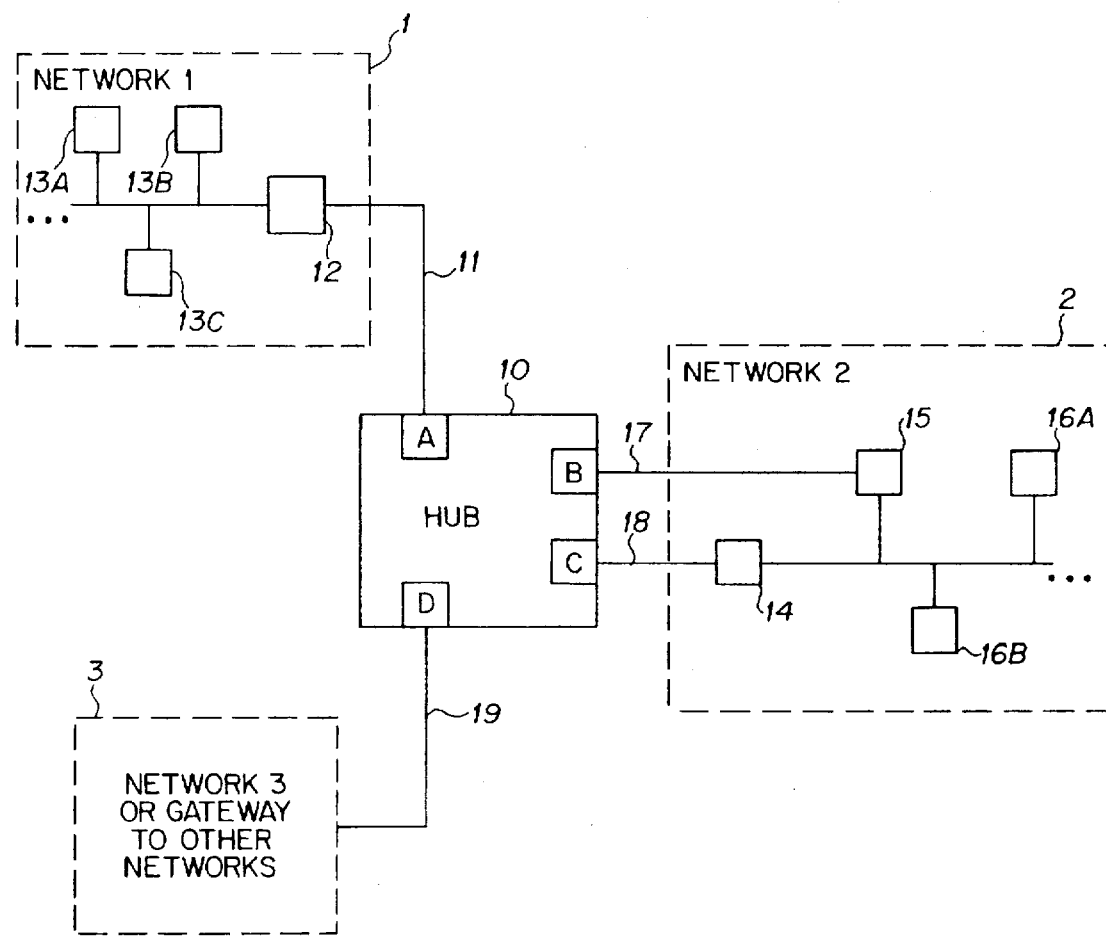
FIG. 1 is a schematic representation of several networks connected together.
Figure 2:
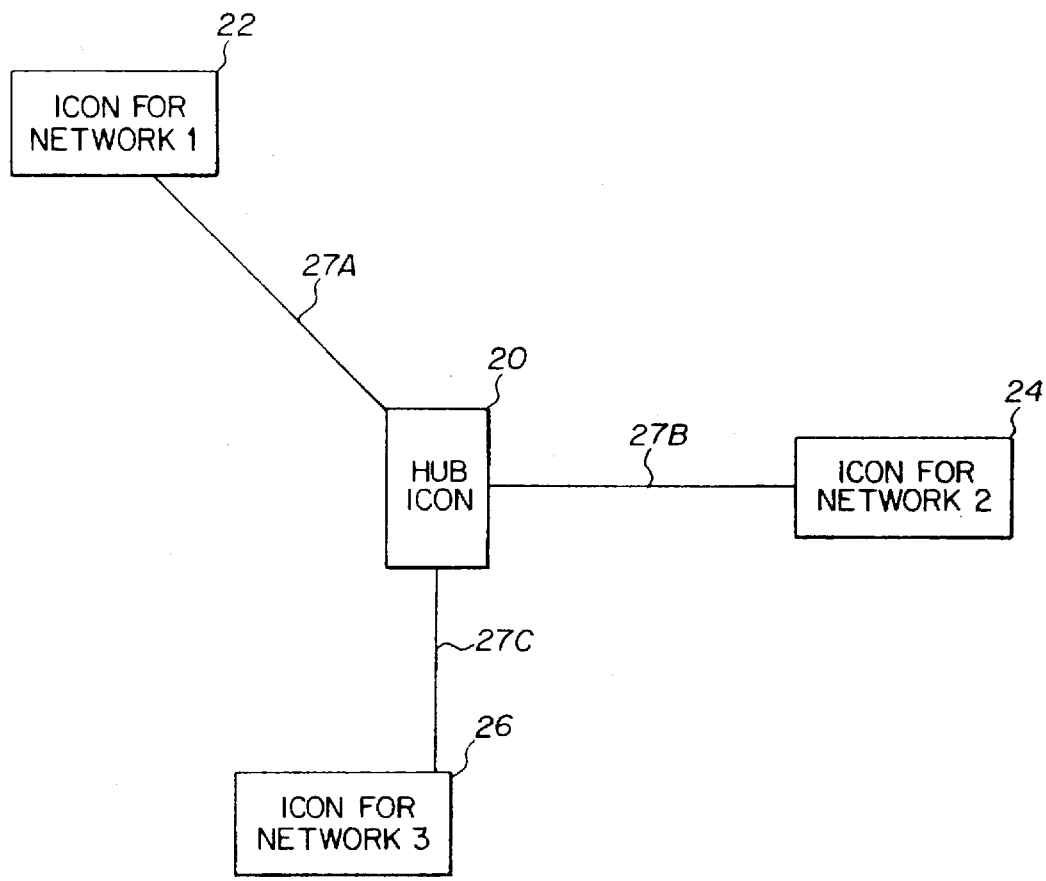
FIG. 2 is a display representative of a prior art approach for conveying to a user information regarding the networks of FIG. 1.

As discussed with respect to connections 17 and 18 of FIG. 1, a data path may be implemented by a number of parallel connections. For example, in the network shown in FIG. 1, data may flow from network 2 to hub 10 via connection 17 or connection 18, or via both connections 17 and 18. In such an instance, one of the connections 17 or 18 is typically disabled. However it is possible for both parallel connections 17 and 18 to be enabled simultaneously. In any event, the two different connections may have different conditions, because one may be capable of transferring, data while the other is not capable or less capable of transferring data.

One approach to representing a situation in which two parallel connections constitute a data path is to display two separate icons, each having a color representative of the condition of its respective condition. Another approach, which may simplify the display, is to display a single icon that represents the overall status of the relationship between the second network 2 and the hub 10. Such a single icon may have a color which represents the overall capability of the parallel connections 17 and 18.

FIG. 6 illustrates one approach to selecting a color for an interface icon which represents an interface having, more than one connection. In this example, a table 60 contains override information regarding the color to be displayed depending upon the status of each of the connections. The colors are arranged by level number (left column) and the corresponding status (provided in the right column). In this approach, the highest level of each of the connections is representative of the color to be displayed. For example, if a first connection would be represented by the color green (e.g., because both ports are "good" as shown in FIG. 5), but a second connection would have been represented by the color red (e.g., because both ports are "bad" as shown in FIG. 5), then the resulting override color would be level 4 (i.e., the highest level in the override table), so that the interface would be represented by the color red, and have a status of "bad". As a result of the override selection, the color displayed represents the amount of degradation in the overall connection.

FIG. 6 shows the additional color yellow (level 2), which may, for example, indicate an intermittent or degraded mode. FIG. 6 also demonstrates that the color blue (level 7) may be used to represent an initialized state, to which the condition of an interface may be set when a port or interface has first been powered or started.

Alternatively, the color displayed could represent the resulting capability of the parallel connections. For example, if one of the parallel connections is not capable of transferring data but the other of the parallel connections is capable of transferring data, a single icon having the color green may be displayed, indicating that data may still be transferred. Thus, in this alternative, one "green" connection in parallel with a "red" connection may still yield a "green" interface.

Additionally, the displayed color of a parallel connection may be indicative of a degraded mode, for example a different shade of green, or a broken green or yellow field.

Figure 7:
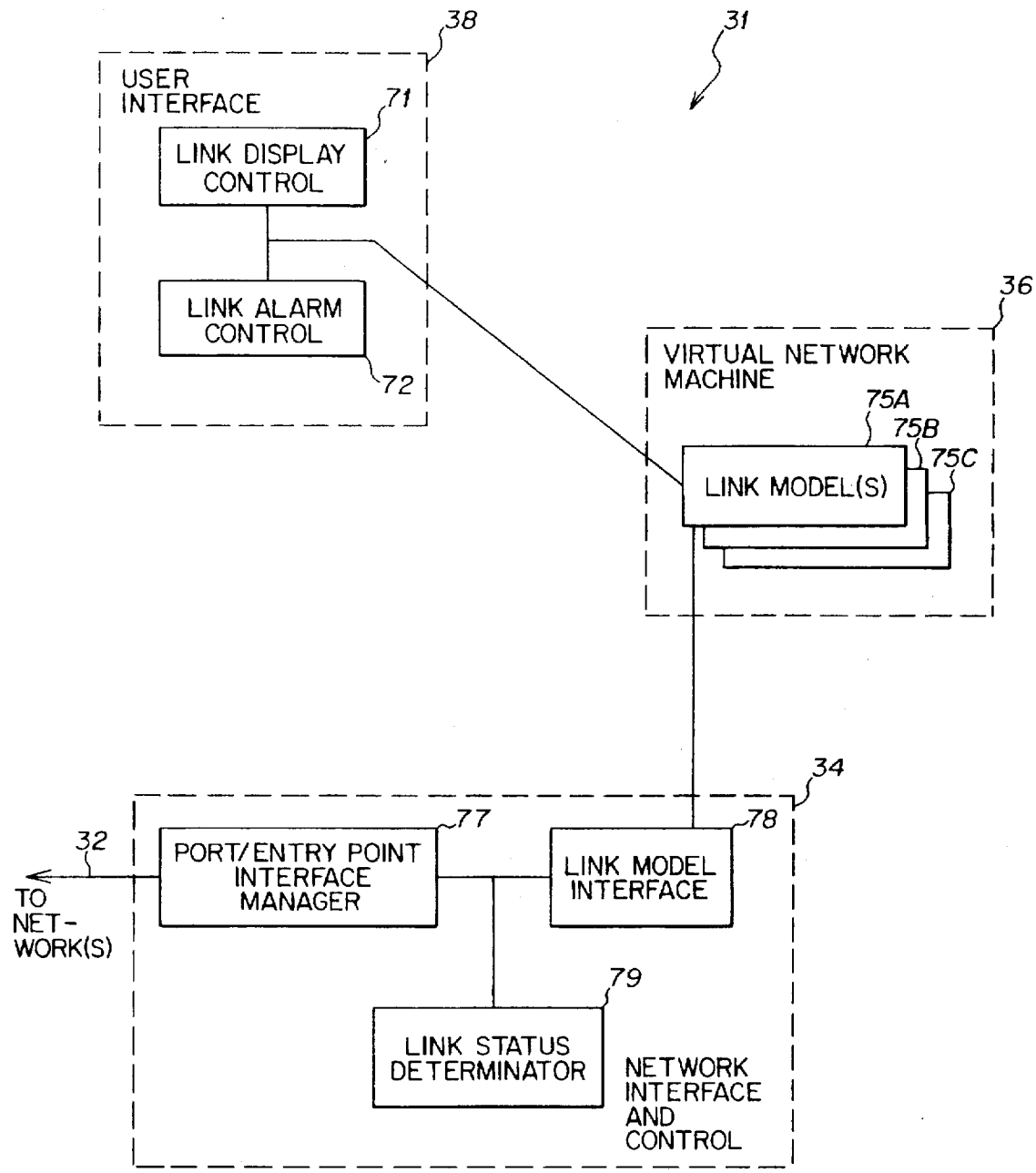
FIG. 7 is a detailed block diagram of the elements within the network management system of FIG. 3.

FIG. 7 illustrates in greater detail a block diagram of the network management system 31. The elements shown in FIG. 7 have been added to previously existing modules of the existing SPECTRUM network management system in order to add functions such as those represented by the flow diagram of FIG. 4. In such an embodiment, the user interface 38 includes a link display control 71 and a link alarm control 72. The control 71 provides instructions to display the link icons that represent connections and other data paths, as well as color selection and control. The control 72 provides instructions to display alarms that are associated with the displayed link icons.

The structure of the virtual network machine 36 is augmented to include multiple link models 75A, 75B, and 75C. In the network interface and control module 34, which connects the virtual network machine 36 to the network, there are now included a port/entry point interface manager 77, a link status determinator 79 and a link model interface 78. Based on information received from the network, the determinator 79 determines the link status which is maintained in machine 36 as a model.

Figure 8:
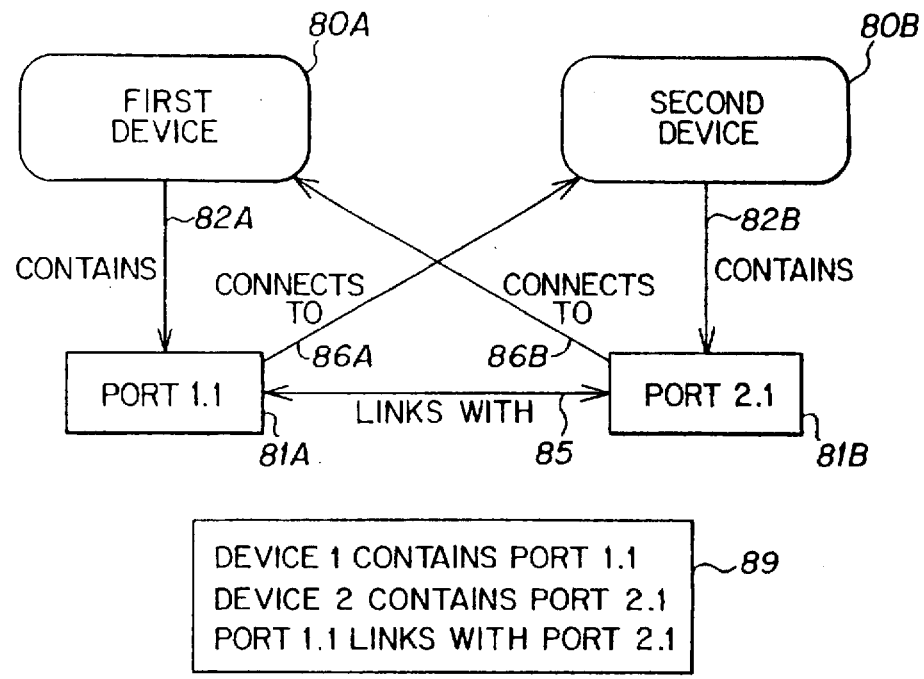
FIG. 8 illustrates an object diagram of a connection between two devices, as represented in the virtual network machine of FIG. 3.

FIG. 8 illustrates an object diagram of a connection between two devices, as they would be represented within the virtual network machine 36. In FIG. 8, a first device 80A contains a port 1.1 (81A), and a second device 80B contains a port 2.1 (81B). Prior to this invention, it would have been necessary to represent a connection between port 1.1 and port 2.1 as two separate "connects to" relationships. In particular, a first "connects to" relationship 86A represents that port 1.1 connects to the second device 80B, and a second "connects to" relationship 86B represents that port 2.1 connects to the first device 80A. However, although the two "connects to" relationships 86A, 86B may be maintained, an additional link model may be added which directly represents the connection between port 1.1 and port 2.1. Such a relationship may be referred to as a "links with" relationship 85. In accordance with the hierarchical nature of object-oriented modeling and control, a "links with" relationship may be representative of a single connection, parallel connections, or any data flow capability. For example, in a low order model, a link may represent a single wire, while in a higher order model, a link may represent several network entities connected in serial and/or parallel which together serve to provide a data path.

Element 89 represents simple object expressions which may be used to indicate a relationship. The relationship "contains" may be represented by an arrow such as 82A and 82B. The expression "device1 contains port 1.1" represents that port 1.1 is a part of the first interface device 80A, and the expression "device2 contains port 2.1" represents that port 2.1 is a part of the second interface device 80B. As previously indicated, the expression "port 1.1 links with port 2.1" may be used to represent the "links with" relationship.

The functions described above may be implemented in specially-designed hardware such as a state machine or separate circuit boards, in any of several programming languages on a general purpose computer, as a programmed general purpose computer itself, or as any combination of such implementations.

Figure 9:
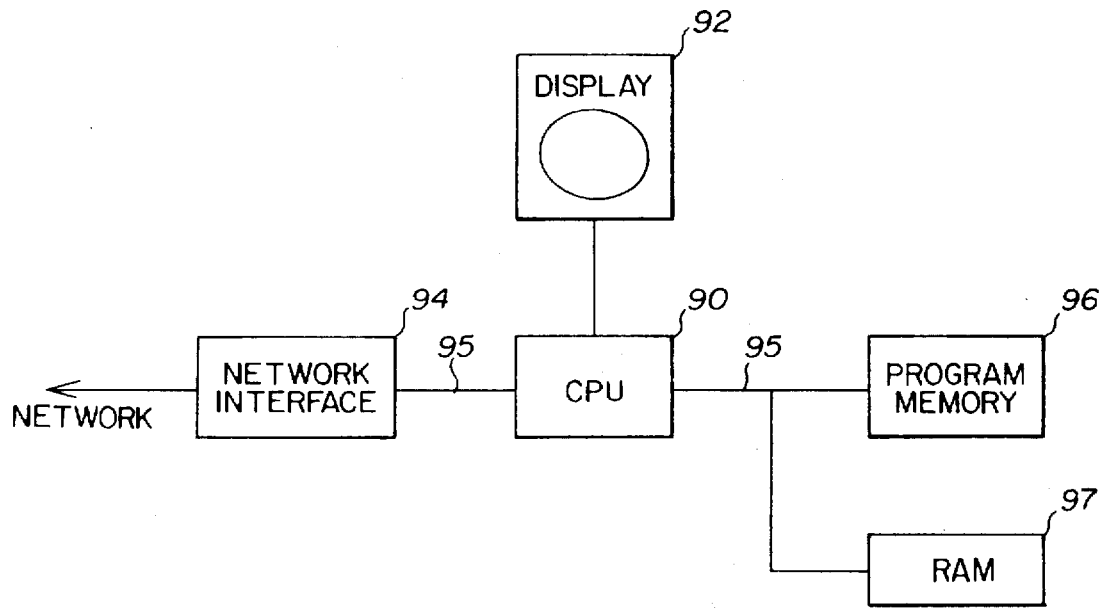
FIG. 9 illustrates a general purpose computer and attachments which may be used in an embodiment of the invention.

For example, the elements of the network management system 31 may be implemented as software on a floppy disk, compact disk, or hard drive, which controls a computer, for example a general purpose computer such as a workstation, a mainframe or a personal computer, to perform the process steps disclosed in FIG. 4, or other processes or structures disclosed herein. Such a general purpose computer is illustrated in FIG. 9. FIG. 9 shows a central processing unit 90 (CPU) which controls a display 92. The CPU 90 is coupled to random access memory 97 (RAM) and program memory 96 via a data bus 95. The general purpose computer may be connected to the network 30 via a network interface 94.

Figure 10:
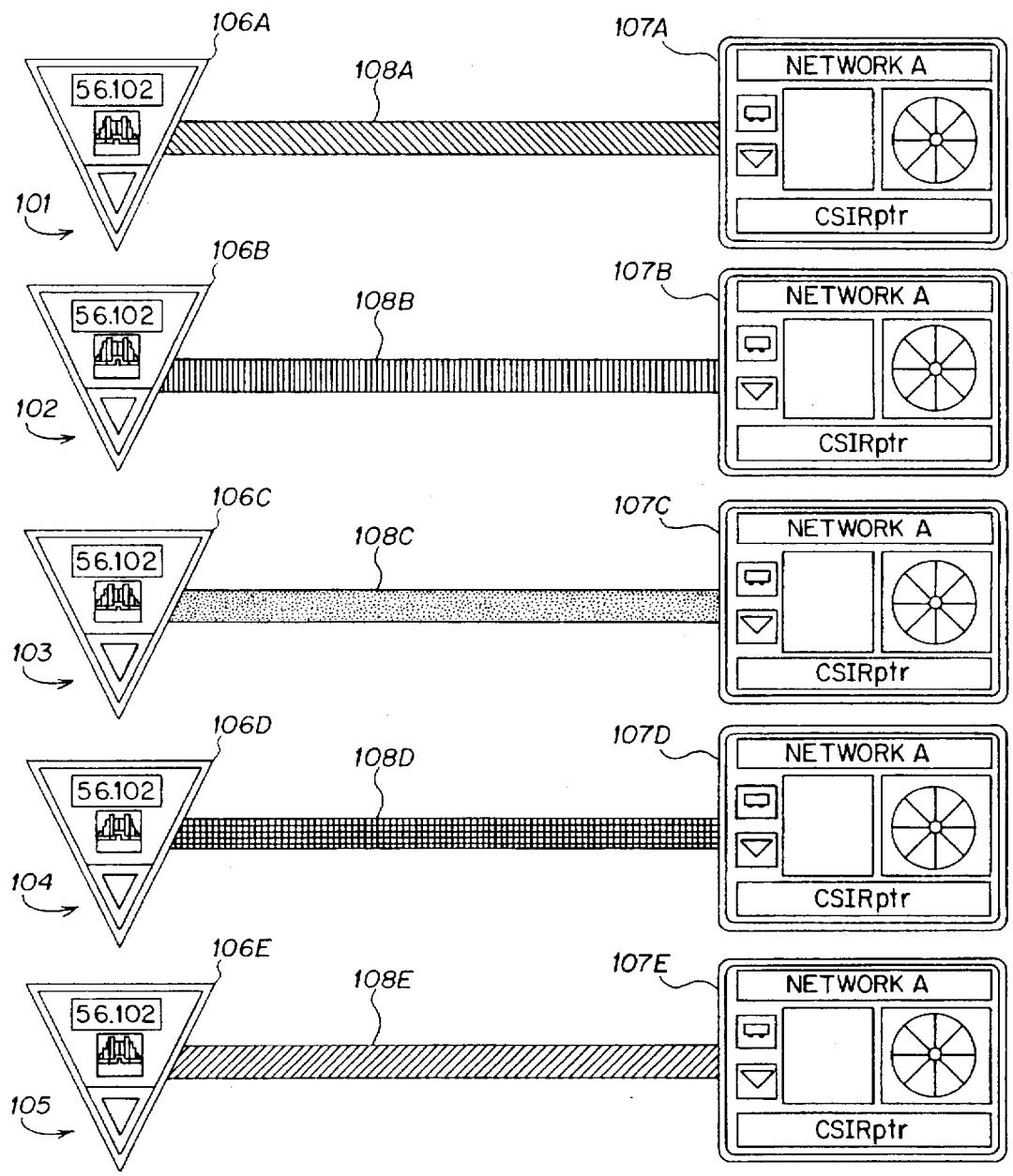
FIG. 10 illustrates several examples of a connection status display between two network entities according to the invention.

FIG. 10 illustrates several examples of a connection status display (101-105), in these examples between a bridge and a network; a legend 100 defines the possible color/status for each connection. Display 101 includes a bridge icon 106A, a network icon 107A, and a link icon 108A having a color (e.g., green) or shading indicative that the status of the connection is good. Display 102 includes a bridge icon 106B, a network icon 107B, and a link icon 108B having a color (e.g., red) or shading indicative that the status of the connection is bad. Display 103 includes a bridge icon 106C, a network icon 107C, and a link icon 108C having a color (gray) or shading indicative that the status of the connection is unknown. Display 104 includes a bridge icon 106D, a network icon 107D, and a link icon 108D having a color (e.g., orange) or shading indicative that the status of the connection is bad or disabled. Display 105 includes a bridge icon 106E, a network icon 107E, and a link icon 108E having a color (e.g., brown) or shading indicative that the status of the connection is known to be disabled. With appropriate coloring or shading of a link icon, a user may immediately interpret the status of the interface between the bridge and the network, thus making network administration more efficient and effective.

Figure 11:
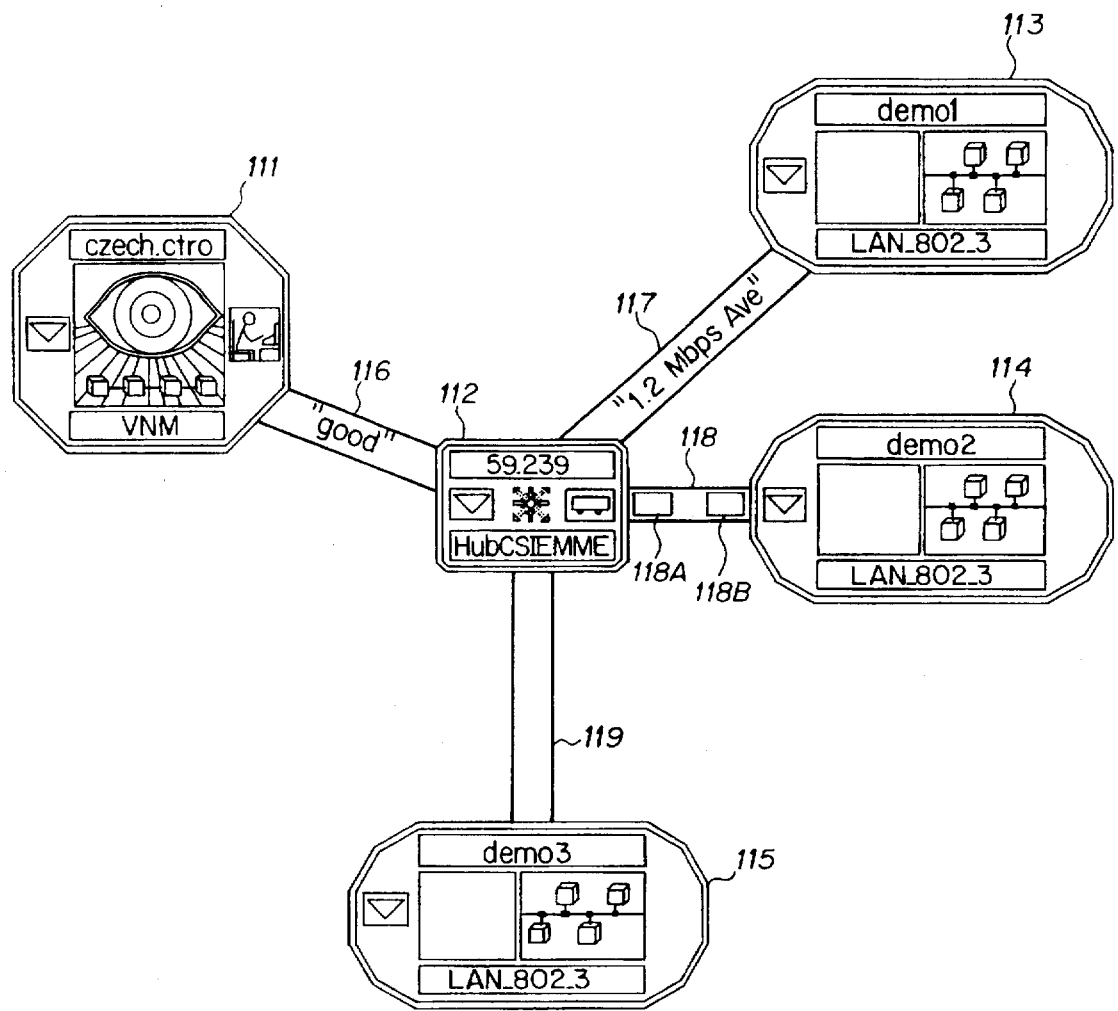
FIG. 11 illustrates another example of a display represented by a network management system for the networks shown in FIG. 1.

FIG. 11 illustrates another example of a display represented by the network management system 31 for the networks shown in FIG. 1. FIG. 11 includes a SPECTRUM icon 111, a hub icon 112, a first network icon 113, a second network icon 114, and a third network icon 115. Additionally, a first link icon 116 is displayed with the color white, as are the second link icon 117 and third link icon 118. However, a fourth link icon 119, between the hub icon 112 and the third network icon 115, is displayed as shaded or gray, indicating that the status of the connection between the hub 10 and the third network 3 is degraded. Other views such as hierarchical views may also display such link icons.

Also, as indicated in FIG. 11, any of the link icons may contain additional textual information. For example, link icon 116 contains the text "good," indicative that the data flow between the SPECTRUM network management system and the hub 10 is operational. Additionally, link icon 117 contains the text "1.2 Mbps Ave." indicative that the average throughput between the hub 10 and the first network 1 is 1.2 Megabits per second.

Figure 12:
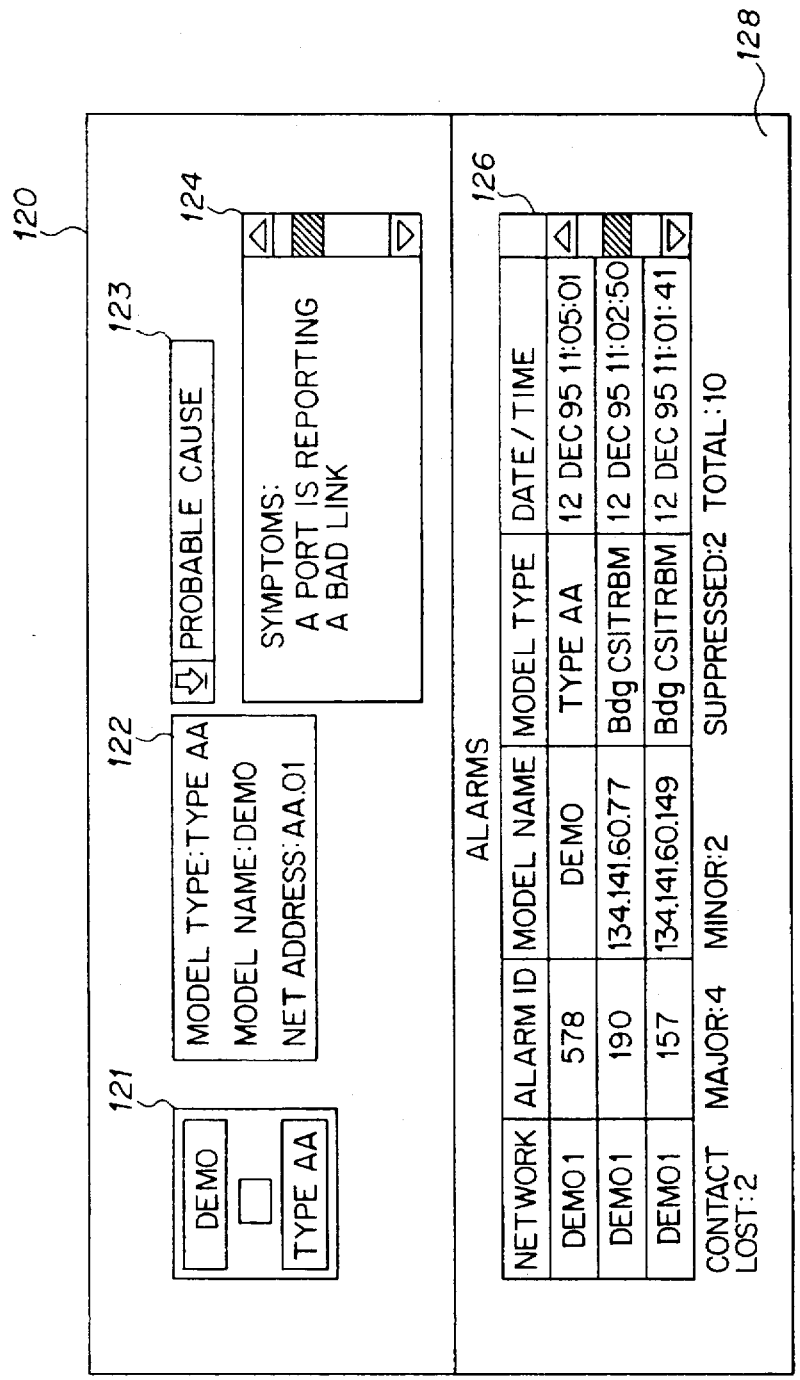
FIG. 12 represents a connection alarm view provided by an embodiment of the invention.

Also, a link icon may contain "hot-spots" such as hot-spot 118A and hot-spot 118B within link icon 118. These hot-spots may be selected by a user to request additional information. For example, the additional information that may be obtained by selecting hot-spot 118A or 118B, is illustrated in FIG. 12, which represents an alarm view for a connection. The alarm view 120 includes an icon 121 of device "demo" which provided the alarm; the alarm is related to a particular connection, such as the parallel connections 17 and 18 represented by link icon 118. An information field 122 may include information regarding the device "demo." Windows 123 and 124 may be manipulated by the user to provide additional information regarding the alarm, which in this example is a report of a bad link. Additionally, a window 126 may display a series of associated alarms and additional information regarding each of these associated alarms. The alarm view 120 may also contain more data as desired in another window 128, such as statistical information regarding related alarms.

Having thus described at least one illustrative embodiment of the invention, various modifications and improvements will readily occur to those skilled in the art and are intended to be within the present invention. Accordingly, the foregoing description is by way of example only, and not intended to be limiting. The invention is limited only as defined in the following claims and the equivalents thereto.

We claim:

1. A method for resolving a condition of a connection within a communications network to a user, comprising the steps of:
   (a) determining a condition of a first interface element of the network;
   (b) determining a condition of a second interface element of the network, the first and second interface elements sharing the connection within the network;
   (c) combining the conditions of the first and second interface elements to determine the condition of the connection from a predetermined plurality of connection conditions the predetermined plurality of connection conditions including a disabled/bad condition indicative that the connection would not be operable even if a disabled one of the first and second interface elements were to be enabled; and
   (d) displaying a representation of the condition of the connection to the user.

2. The method of claim 1, wherein:
   the first interface element is a first port of a first device;
   the second interface element is a second port of a second device.

3. The method of claim 1, further comprising the step of storing a predetermined plurality of interface element conditions, and wherein step (a) includes classifying the first interface element condition as one of the predetermined plurality of interface element conditions.

4. The method of claim 3, wherein the step of storing the predetermined plurality of interface element conditions includes storing the following predetermined conditions:
   a good condition indicative that the interface element has an operational status;
   a bad condition indicative that the interface element has a faulty status;
   an unknown condition indicative that the interface element has an unknown status;
   a disabled condition indicative that the interface element has a disabled status; and
   an unreachable condition indicative that the interface element has a not communicating status.

5. The method of claim 1, further comprising:
   maintaining a logical representation of the network that includes a model representative of the condition of the connection.

6. The method of claim 1, wherein step (c) includes determining the condition of the connection from the following predetermined conditions:
   a good condition indicative that the connection has an operational status;
   a bad condition indicative that the connection has a faulty status;
   an unknown condition indicative that the connection has an unknown status;
   a disabled condition indicative that the connection has a disabled status; and
   an initial condition indicative that the connection has a recently established status.

7. The method of claim 1, wherein step (c) includes logically combining the conditions of the first and second interface elements to determine the condition of the connection.

8. The method of claim 1, wherein step (d) includes displaying the representation as a graphical image having a selected color based upon the condition of the connection.

9. The method of claim 1 wherein step (d) includes displaying the representation in a plurality of different displays that represent different information about the network.

10. The method of claim 1, further comprising the steps of:
    maintaining a logical representation of the network that includes a first model representative of the first interface element and a second model representative of the second interface element;
    associating the relationship condition with each of the first and second models.

11. The method of claim 1, further comprising the step of monitoring the network to determine when the relationship is established, and wherein step (a) is performed when the relationship is established.

12. The method of claim 1, further comprising the step of monitoring the network to determine when the condition of the first interface element changes, and wherein step (a) is performed when the condition of the first interface element changes.

13. The method of claim 1, wherein the step (c) of combining includes:
    determining a condition of a first data path between the first interface element and the second interface element;
    determining a condition of a second data path that is parallel with the first data path, the first data path and second data path providing a parallel data path;
    logically combining the condition of the first data path with the condition of the second data path to create a condition representative of the parallel data path;
    and wherein the step of displaying includes displaying the condition representative of the parallel data path.

14. An apparatus for resolving a condition of a connection within a communications network to a user, comprising:
    first means for determining a condition of a first interface element of the network;
    second means for determining a condition of a second interface element of the network, the first and second interface elements sharing the connection in the network;
    third means for combining the conditions of the first and second interface elements to determine the condition of the connection from a predetermined plurality of connection conditions the predetermined plurality of connection conditions including a disabled/bad condition indicative that the connection would not be operable even if a disabled one of the first and second interface elements were to be enabled; and
    fourth means for displaying a representation of the condition of the connection to the user.

15. The method of claim 1, wherein step (a) includes determining the condition of the first interface element from a predetermined plurality of interface element conditions that is different from the predetermined plurality of connection conditions.

16. The apparatus of claim 14, wherein:
    the first interface element is a first port of a first device;
    the second interface element is a second port of a second device.

17. The apparatus of claim 14, further comprising means for storing a predetermined plurality of interface element conditions, and wherein the first means includes means for classifying the first interface element condition as one of the predetermined plurality of interface element conditions.

18. The apparatus of claim 17, wherein the predetermined plurality of interface element conditions includes:

a good condition indicative that the interface element has an operational status;

a bad condition indicative that the interface element has a faulty status;

an unknown condition indicative that the interface element has an unknown status;

a disabled condition indicative that the interface element has a disabled status; and an unreachable condition indicative that the interface element has a not communicating status.

19. The apparatus of claim 14, further comprising means for maintaining a logical representation of the network that includes a model representative of the condition of the connection.

20. The apparatus of claim 14, wherein the predetermined plurality of connection conditions includes:

a good condition indicative that the connection has an operational status;

a bad condition indicative that the connection has a faulty status;

an unknown condition indicative that the connection has an unknown status;

a disabled condition indicative that the connection has a disabled status; and an initial condition indicative that the connection has a recently established status.

21. The apparatus of claim 14, wherein the third means includes means for logically combining the conditions of the first and second interface elements to determine the condition of the connection.

22. The apparatus of claim 14, wherein the fourth means includes means for displaying the representation as a graphical image having a selected color based upon the relationship condition.

23. The apparatus of claim 14, wherein the fourth means includes means for displaying the representation in a plurality of different displays that represent different information about the network.

24. The apparatus of claim 14, further comprising:

means for maintaining a logical representation of the network that includes a first model representative of the first interface element and a second model representative of the second interface element; and means for associating the relationship condition with each of the first and second models.

25. The apparatus of claim 14, further comprising means for monitoring the network to determine when the relationship is established, and wherein the first means is responsive to the relationship being established.

26. The apparatus of claim 14, further comprising means for monitoring the network to determine when the condition of the first interface element changes, and wherein the first means is responsive to the condition of the first interface element changing.

27. The apparatus of claim 14, wherein the third means includes:

means for determining a condition of a first data path between the first interface element and the second interface element;

means for determining a condition of a second data path that is parallel with the first data path, the first data path and second data path providing a parallel data path;

means for logically combining the condition of the first data path with the condition of the second data path to create a condition representative of the parallel data path;

and wherein the fourth means includes displaying the condition representative of the parallel data path.

28. The apparatus of claim 14, wherein the first means includes means for determining the condition of the first interface element from a predetermined plurality of interface element conditions that is different from the predetermined plurality of connection conditions.

* * * * *

UNITED STATES PATENT AND TRADEMARK OFFICE
CERTIFICATE OF CORRECTION

PATENT NO. : 5,751,965
DATED      : May 12, 1998
INVENTOR(S): Mayo et al.

It is certified that error appears in the above-identified patent and that said Letters Patent is hereby corrected as shown below:

Col. 5, line 21 -- delete "object" and substitute -- objects --

Col. 6, line 39 -- after "30" delete -- ) --

Col. 6, line 44 -- delete "all" and substitute -- an --

Col. 6, line 49 -- delete "ail" and substitute -- an --

Col. 6, line 60 -- delete "ill" and substitute -- in --

Signed and Sealed this

Third Day of August, 1999

Attest:

Attesting Officer

Q. TODD DICKINSON

Acting Commissioner of Patents and Trademarks